United States Patent
Kommareddi et al.

(10) Patent No.: US 7,045,101 B2
(45) Date of Patent: May 16, 2006

(54) METHOD OF PREPARING A POLYMER UNDER PREDETERMINED TEMPERATURE CONDITIONS, AND APPARATUS THEREFOR

(75) Inventors: Nagesh Sri Kommareddi, Broken Arrow, OK (US); George Gervin Ramsay, Sand Springs, OK (US); John Francis Motier, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/114,850

(22) Filed: Apr. 26, 2005

(65) Prior Publication Data

US 2005/0222346 A1  Oct. 6, 2005

Related U.S. Application Data

(62) Division of application No. 10/373,361, filed on Feb. 24, 2003.

(51) Int. Cl.
*B01J 19/24* (2006.01)

(52) U.S. Cl. .................. 422/134; 422/138; 422/188; 422/202; 165/170

(58) Field of Classification Search .............. 422/138, 422/188, 198, 134, 202; 165/170
See application file for complete search history.

(56) References Cited

U.S. PATENT DOCUMENTS

| | | | |
|---|---|---|---|
| 3,140,917 A * | 7/1964 | Klein ..................... | 422/138 |
| 3,842,904 A | 10/1974 | Gardenier | |
| 4,058,654 A | 11/1977 | Sutter et al. | |
| 4,527,581 A | 7/1985 | Motier | |
| 4,647,633 A | 3/1987 | Kostelnik | |
| 4,845,178 A | 7/1989 | Hostetler et al. | |
| 5,449,732 A | 9/1995 | Smith et al. | |
| 5,504,131 A | 4/1996 | Smith et al. | |
| 5,504,132 A | 4/1996 | Smith et al. | |
| 5,829,517 A | 11/1998 | Schmid | |
| 6,015,779 A | 1/2000 | Eaton et al. | |
| 6,160,036 A | 12/2000 | Kommareddi et al. | |
| 6,168,765 B1 | 1/2001 | Romatier et al. | |
| 6,252,016 B1 | 6/2001 | Wu et al. | |
| 6,380,324 B1 | 4/2002 | McFadden et al. | |
| 2002/0192133 A1 | 12/2002 | Eaton et al. | |

FOREIGN PATENT DOCUMENTS

| | | |
|---|---|---|
| WO | WO 00/69924 A1 | 11/2000 |
| WO | WO 02/085511 A1 | 10/2002 |
| WO | WO 02/100532 A1 | 12/2002 |
| WO | WO 03/033132 A1 | 4/2003 |

\* cited by examiner

*Primary Examiner*—Fred Teskin
(74) *Attorney, Agent, or Firm*—Madan, Mossman & Sriram P.C.

(57) ABSTRACT

A method of preparing a polymer under predetermined temperature conditions comprises conducting the polymerization within a closed reaction chamber configured such that most or all of an inner surface has heat exchange capability. The chamber's dimensions are such that the polymerization mixture contacts the effective heat exchange surface sufficiently to ensure that the temperature throughout the polymerization mixture does not vary more than a few degrees from a desired temperature. In one embodiment the chamber is formed of two adjacent, parallel heat exchange plates, wherein at least one plate has a peripheral lip which, in contact with the opposing plate, forms the closed chamber. Multiple plates can be arrayed to form multiple chambers, and each chamber's polymerization temperature, as well as resident polymerization mixture, can be individually predetermined. This method and apparatus are particularly useful for preparing polymers used in drag reducing agents for hydrocarbon transportation pipeline applications, as well as other polymers benefiting from narrow and/or customized temperature profiles during production.

12 Claims, 2 Drawing Sheets

//METHOD OF PREPARING A POLYMER UNDER PREDETERMINED TEMPERATURE CONDITIONS, AND APPARATUS THEREFOR

CROSS-REFERENCE TO RELATED APPLICATION

This application is a divisional of U.S. Ser. No. 10/373,361 filed Feb. 24, 2003.

BACKGROUND OF THE INVENTION

1. Field of the Invention

This invention relates to the field of methods for preparing polymers. More particularly, it relates to the field of preparation of polymers that are useful as drag reducing agents in hydrocarbon transportation pipelines.

2. Background Art

The use of poly-alpha-olefins and copolymers thereof to reduce the effect of friction ("drag") experienced by a liquid hydrocarbon flowing through a hydrocarbon transportation pipeline is well-known in the art. Reduction of the drag decreases the amount of energy needed to accomplish such flow, and therefore also decreases the costs associated with pumping. These materials, called drag reducing agents, can take various forms, including certain polymers in oil soluble suspensions, emulsions, pellets, gels, microfine powders, and particulate slurries. However, particulate slurries, comprising ground polymers, are often the least expensive form. The ultimate goal is a drag reducing agent which rapidly dissolves in the flowing hydrocarbon and which has a polymer content sufficient to ensure that the desired level of drag reduction is achieved.

The polymers which are most frequently used in preparing drag reducing agents are poly-alpha-olefins of carbon chain lengths ranging from 2 to about 40. Frequently these polymers are prepared using Ziegler-Natta catalysts and frequently also co-catalysts such as alkyl aluminum compounds. These polymerization reactions tend to be very efficient, producing relatively high yield when carried out in bulk. However, they also tend to be highly exothermic. The exotherm itself creates problems which reduce the usefulness of the product if the exotherm is not effectively alleviated. These problems include, in particular, a substantial reduction in the polymer molecular weight. Such molecular weight loss can result from even relatively minor deviations from a preselected optimal temperature, and can substantially reduce the efficacy of the polymer in a drag reducing agent formulation.

Those skilled in the art have attempted to reduce or otherwise control this exotherm in order to improve the quality of the polymers being produced. Some attempts to accomplish this have included, for example, carrying out the polymerization reaction in specially designed reaction bottles, wherein reactor layers ostensibly provide a level of protection from oxygen and water as potential sources of contamination. The bottles are stored in a cold room during the polymerization in order to reduce the exotherm by providing better heat removal from the reaction bottles.

Another method of addressing the exotherm problem for drag reducing agent polymers has been to use a screw conveyor as the reactor. This method is, however, ill-suited to producing larger quantities of polymer per batch, since in such cases a large screw conveyor must be used to achieve a commercially acceptable polymerization time. Unfortunately, the larger the conveyor, the less effective the heat transfer, and the less effective the heat transfer, the poorer the temperature control and, hence, the quality of the final drag reducing agent polymer.

Accordingly, what is needed in the art is a method of polymerization that preferably enables relatively tight control and/or overall reduction of the exotherm resulting from polymerization, such that high quality drag reducing agent polymers, as well as other polymers which would otherwise encounter similar undesired exotherm problems, can be produced in bulk.

SUMMARY OF THE INVENTION

In one embodiment the present invention provides a method of preparing a polymer under predetermined temperature conditions. This method includes allowing a polymerization mixture to polymerize in a closed reaction chamber to form a polymer. The chamber is configured as a void space surrounded by an inner chamber surface of which at least about 75 percent is an effective heat exchange surface. The void space's dimensions are such that, during the polymerization, the polymerization mixture contacts the effective surface sufficiently to ensure that the temperature throughout the polymerization mixture does not vary more than 5 degrees Fahrenheit (about 3 degrees Celsius) from a desired temperature. Once the polymerization is complete, the reaction chamber can be opened and the polymer removed.

In another embodiment the present invention is an apparatus suitable for the practice of the given method.

In still another embodiment the present invention is an apparatus comprising a plurality of such reaction chambers, enabling independent control of the temperature of the polymerization mixture within each chamber.

These and other embodiments of the present invention will be described in greater detail hereinbelow.

DETAILED DESCRIPTION OF THE INVENTION

Figure 1:
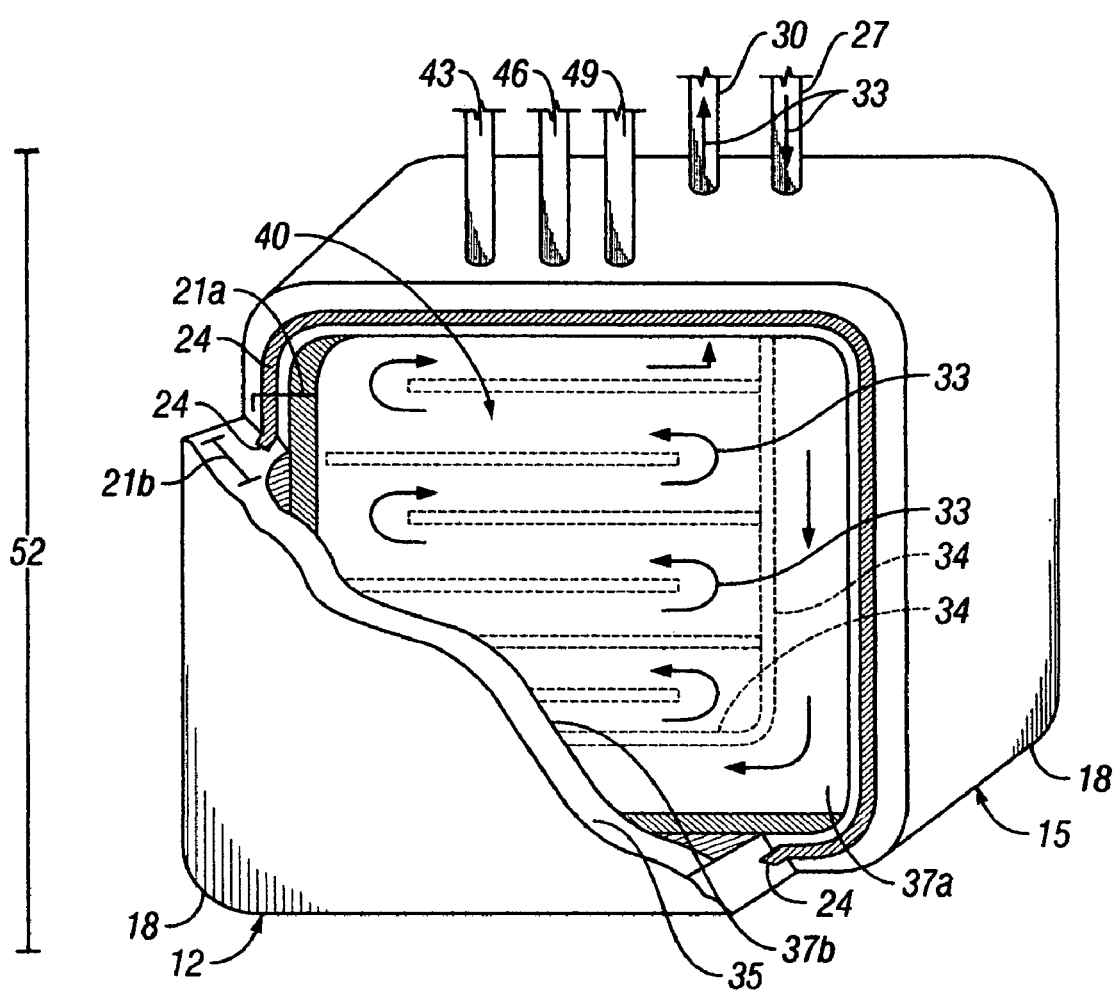
FIG. 1 is a cut-away and perspective view of the reaction chamber apparatus of the present invention.

The present invention offers the polymerization art a simple and cost-effective method of bulk polymerization that is particularly, though not solely, applicable to producing superior quality polymers for use in preparing drag reducing agents. Because relatively precise control of the polymerization exotherm can be hereby achieved, production of polymer showing poor quality or poor performance can be minimized or avoided.

A key feature of the invention is the carrying out of the polymerization within a chamber of which at least about 75% of the inner surface thereof, preferably at least about 85%, more preferably at least about 90%, is an effective heat exchange surface as defined. Thus, the chamber is effectively "lined" with such effective heat exchange surface.

A second key feature of the invention is the dimensional configuration of the chamber. This configuration ensures relatively close proximity and/or direct contact of each portion of the polymerization mixture with the effective heat exchange surface, which enables tight control of the temperature under which the polymerization occurs throughout the polymerization mixture. The result is superior quality product with a minimum of deviation in character and properties from those which can be predicted based on the desired polymerization temperature alone.

The preferred configuration of the reaction chamber can be seen to be loosely based on the so-called "plate and frame heat exchanger," generally known in the field of chemical engineering as useful for transferring heat from one liquid to another. Plate and frame heat exchangers known in the art consist essentially of an array of two or more, frequently rectangular "plates". These plates, which are frequently although not necessarily two-sided to enable heat exchange to occur on either side thereof, are constructed of a relatively conductive material and with an internal space to enable circulation of a coolant via appropriate connection or connections to a coolant source.

In contrast with the art-known apparatus, in one embodiment of the present invention a pair of plates is used, with at least one plate given a novel configuration with a raised "peripheral lip" along the edges thereof. This raised peripheral lip enables the plates, upon contact of the peripheral lip (or lips) thereof, to serve as a reversibly closable reaction chamber. Thus, the "gap", i.e., the shortest distance between, the opposing plate surfaces where the polymerization mixture will reside during the polymerization, is determined by the thickness of the raised peripheral lip or lips.

In preferred embodiments such peripheral lip is constructed of a typical metallic construction material, such as steel. However, in more preferred embodiments the specified void space dimension may be further altered by use of a peripheral lip enhancement of a different material. Such enhancement may be, for example, a polymeric O-ring, a sleeve, insert, gasket, or other polymeric or non-polymeric construct designed to increase the security of the closure of the chamber, i.e., to effectively form a seal, around the void space, that is not permeable to the polymerization mixture and/or to air or other identified gases, thus preventing leaks either into or out of the chamber.

In still another embodiment, two differing plate configurations can be employed, such that, rather than two peripheral lips contacting one another to form the chamber, only one plate has a peripheral lip (with or without lip enhancement) and the other has a corresponding recess, alternatively termed a "groove". This combination of configurations enables a male-female mating contact of the two plates. Those skilled in the art will be aware that the groove can be effectively lined with a polymeric or other material to increase the effectiveness of the seal.

While a plate and frame heat exchanger represents a particularly effective and easily-modified basis for the closed chamber used in the method and apparatus of the present invention, it is also possible to use any other combination of materials and configurations that meet the limitations of the claims appended hereto. Those basic requirements are, first, that at least about 75% of the inner chamber surface be the effective heat exchange surface. More preferably, such effective heat exchange surface is at least about 80%, and most preferably at least about 90%, of the inner chamber surface. The remainder of the inner surface could be, for example, the inner surface of the peripheral lip or lips. By "effective heat exchange surface" is meant the heat exchange surface that will be in direct physical contact with the polymerization mixture during polymerization. In preferred embodiments, the effective heat exchange surface is constructed with an active cooling means disposed in contact with its "back", i.e., with the surface that is located "behind" the defined effective heat exchange surface.

Such cooling means is generally a flowing, cooled liquid or gas, which is flowed behind the effective surface with the purpose of contacting the back of the effective surface, to enable removal of heat from the polymerization mixture contacting the effective heat exchange surface itself. The coolant is preferably flowed from a coolant source, external to the chamber, through appropriate flow conduit to flowably contact the back of the effective heat exchange surface. Typical heat exchanger plate configuration can be advantageously employed as a model for construction of a chamber wall, i.e., an essentially planar, bi-panel hollow structure, preferably with welds or other internal connections between the two panels that can serve to route coolant flow to ensure flowable contact between the coolant and as much of the back of the effective surface as possible. Ensuring maximal flow of the coolant maximizes heat removal from the polymerization mixture in contact with the inner chamber surface.

In the present invention the effective heat exchange surface can be prepared of any of a variety of materials, and is preferably a material which is both adequately durable during the period of time it is in contact with the polymerization mixture that will be employed, and also exhibits a relatively high thermal conductivity. For example, stainless steel, glass, copper, brass, aluminum, combinations thereof, and the like are suitable. Preferably, such thermal conductivity is at least about 15 W/m-K. Such effective heat exchange surface can be polished or unpolished, but polished materials facilitate easier removal of the resulting solid polymers contacting the effective heat exchange surface.

One important advantage that can be obtained in selecting a plate and frame heat exchange approach to construction of the chamber of the present invention is that the chamber, formed in that embodiment by contact of a peripheral raised lip around one or both such plates, can be easily opened for removal of the polymer. Such polymer can be formed in, for example, slabs of varying dimension, but because the two plates can be completely separated to fully open the chamber, the resulting one-piece slab can be simply peeled off of the plate.

Such removal can be further facilitated by use of a release agent prior to introduction of the polymerization mixture into the void space. This release agent can be applied to what will become the inner chamber surface, prior to forming the chamber by contacting or abutting the peripheral lip of at least one of the plates with an appropriate contact surface of the other plate. An appropriate release agent can be, for example, a liquid, gel, wax, powder or other microfine particulate, or oil, or an oil- or water-based emulsion or dispersion. Examples thereof include polyethylene glycol, polyethylene wax, polytetrafluoroethylene dispersions, silicone emulsions, and the like. A particularly convenient method of application to the inner chamber surface is spraying. Other materials, including plastic and metal films such as polyethylene film or aluminum foil, can also be appropriately positioned to serve as a release agent. It is preferred that such release agent be selected such that, by virtue of its quantity and/or quality, its presence on the inner chamber surface will not undesirably interfere with the polymerization reaction or the properties or performance of the product polymer. Such release agent can be applied or positioned at an appropriate interval prior to introduction of the polymerization mixture into the chamber.

Another important advantage of the present invention is that the chamber construction can be easily adapted, based on the plate and frame model, to form a multi-chamber apparatus. This embodiment requires an array of plates, at least one of each adjacent pair having the raised peripheral lip configuration and, preferably, a bi-panel heat exchange surface, such that alignment and abutment of the multiple plates results in a series of chambers. Advantageously, use of such a multi-chamber configuration dramatically increases the potential polymer output for a given time period. It may therefore be more appropriate for a given location than would a single chamber, which could conceivably have substantial height and width dimensions running to several feet or even tens of feet or more, but would be limited in its third (depth) dimension because of the requirement of relatively close proximity or contact between every portion of the polymerization mixture and the effective heat exchange surface. Accordingly, any single reaction chamber of the present invention preferably has a "gap", i.e., a shortest distance across the void space between opposing effective heat exchange surfaces, of less than or equal to about 3 inches, and more preferably such is less than or equal to about 2 inches.

Another advantage of the multi-chamber apparatus is the potential capability of such to be fitted with appropriate inlet and coolant sources and means such that each chamber polymerization environment can be "customized". This is easily accomplished by, for example, simply aligning a series of appropriate heat exchange plates, at least one of each pair bearing the peripheral lip configuration, and contacting the plates appropriately to form a series of chambers, the number of which corresponds to n−1, n being the total number of plates in the series. The plates can be moved or slid on the frame assembly in order to accomplish such closure and, when the polymer is ready to be removed, subsequent opening thereof. In this embodiment of the present invention each chamber can be "set" for a different polymerization temperature, using independent coolant sources, and therefore the product being produced in one chamber need not be identical to that being produced in another, unless that is the desire. Direct measurement of the temperature within a given polymerization mixture residing in a given chamber can be accomplished via use of appropriate detection means, such as a thermocouple. However, in preferred embodiments careful control of the temperature of a coolant flowed through the heat exchange plates, combined with knowledge common to those skilled in the art concerning the intended polymerization and its anticipated exotherm profile, is usually sufficient to ensure that the polymerization mixture's temperature throughout remains within the 5 degree Fahrenheit (about 3 degree Celsius) maximum variation, preferably within about 3 degrees Fahrenheit (about 2 degrees Celsius), and more preferably within about 2 degrees Fahrenheit (about 1 degree Celsius). Such control ensures a high degree of consistency in obtaining the desired molecular weight in the final polymer product or products.

In the method of the present invention, a polymerization mixture is introduced into the chamber's void space to undergo polymerization therein. Such introduction is preferably via a flowable connection, such as a simple conduit inlet or injection inlet and associated injection means, with a polymerization mixture source. Alternatively, more than one flowable connection can be used, in order to enable simultaneous or stepped introduction of differing reactants, catalysts and co-catalysts that make up the polymerization mixture that polymerizes within the chamber. An additional flowable connection can be established for a purge gas, such as nitrogen, to remove water and other possible contaminants from the chamber immediately prior to introduction of the polymerization mixture; or, alternatively, such a purge gas can be introduced via the same flowable connection as is subsequently used for the polymerization mixture or component(s) thereof.

In the method of the present invention the polymerization mixture preferably includes monomers selected for producing a polymer suitable for use in a drag reducing agent. For such a polymer the monomers are preferably any alpha-olefins ranging in carbon chain length from 2 to about 40, more preferably from about 6 to about 12. Possible selections include, for example, 1-hexene, 1-heptene, 1-octene, 1-nonene, 1-decene, 1-dodecene, combinations thereof, and the like.

Polymerization catalysts are preferably also employed in the polymerization mixture in order to produce drag reducing agent polymers. For this purpose one or more Ziegler-Natta catalysts are preferred. Preferred among these are transition metal chlorides, for example, a titanium chloride catalyst such as aluminum-activated titanium trichloride.

Co-catalysts can also be effectively employed to produce drag reducing agent polymers. In combination with Ziegler-Natta catalysts, alkyl aluminum co-catalysts, including for example dialkyl aluminum chlorides and ethoxides, can be very effective. These include, in more specific example, diethylaluminum chloride, diethylaluminum ethoxide, diisobutyl aluminum chloride, combinations thereof, and the like.

Additional possible components for preparing drag reducing agent polymers include small quantities of solvent diluents to plasticize the drag reducing agent polymer. Such plasticizing materials, which may include, for example, kerosene, mineral oil and other hydrocarbons, including but not limited to synthetically produced isoparaffinic fluids, serve to facilitate dissolution of the polymer in the hydrocarbon stream during use in a pipeline.

Once the components of the polymerization mixture have been selected it is desirable to determine the order of mixing. Those skilled in the art will be easily able to determine an appropriate protocol for this without extensive discussion herein. However, it is noted that the rate and uniformity of polymerization, and therefore also the polymerization's yield, are known to be heavily influenced by the degree of mixing. Mixing also affects the exotherm by promoting its uniformity and thereby eliminating isolated "hot spots", which promotes greater product consistency. In view of this, in the present invention it is preferred that the selected starting materials are first contacted prior to their introduction into the reaction chamber. For example, it is preferred to first mix all components in a stirred and jacketed reaction vessel in a batch. Thereafter the polymerization is preferably allowed to proceed for a short period of time, preferably from about 5 to about 30 minutes, as molecular weight begins to build. This build is evidenced by an initial, measurable viscosity increase. Once the viscosity has begun to increase, the polymerization mixture is preferably pumped into the reaction chamber until maximum volume is reached. This point is most easily discerned simply by stopping pumping once a small amount of polymerization mixture overflows from an overflow exitway or vent leading out of the chamber, or until a pressure gauge located at the polymerization mixture inlet indicates a sharp pressure increase therein.

In another embodiment, inlet conduit from each component source can be flowably connected at a junction point external to the reaction chamber. This embodiment ensures contact of all components, in appropriate proportion, prior to introduction into the chamber. However, it relies upon the dynamics of flow alone to obtain a degree of mixing. Those skilled in the art will be able to easily determine whether this means of mixing will be adequate or appropriate for preparing the desired final product.

In still another embodiment the chamber can be fitted with inlets from each component source, for concurrent introduction of each component. Alternatively, one inlet can be used for all components, with an operator or robot progressively changing connections to the various component sources in a predetermined sequence.

Concurrently with this pumping of the polymerization mixture or of components thereof, it is preferred that a coolant be circulated through a coolant pathway behind the effective heat exchange surface, e.g., within the reaction chamber's wall. Since drag reducing agent polymers are of highest quality when the polymerization temperature is controlled throughout the polymerization within a range from about 0 degrees to about 60 degrees Fahrenheit (about −18 degrees to about 15 degrees Celsius), more preferably from about 5 degrees to about 40 degrees Fahrenheit (about −15 to about 4 degrees Celsius), and most preferably from about 20 degrees to about 30 degrees Fahrenheit (about −6 degrees to about −1 degrees Celsius), it is preferable to ensure that the coolant itself be introduced below or within the lower part of the selected temperature range. Coolant selection can be any fluid known in the art for this purpose. Preferably such fluid will be compatible with the construction components to which the coolant will be exposed, and preferably can be easily recycled for economic reasons. For example, chilled water, oils or other chilled or naturally cold liquids such as liquid nitrogen, gas coolants such as known refrigerants, and the like can be used. However, for producing drag reducing agents, a particularly advantageous and inexpensive choice is a mixture of cold ethylene glycol and water.

It is preferred that residence time of the polymerization mixture within the reaction chamber be from about 16 to about 30 hours. For most purposes this enables maximum polymer yield within reasonable commercial expectations. However, longer and shorter times may also be sufficient to accomplish preparation of the desired final polymer. Nonetheless, for drag reducing agent polymers in particular, a residence time of about 24 hours is particularly preferred.

Once it is determined that the polymerization reaction has proceeded to high conversion levels, which can be done by, for example, probing of the hardness or "set" of the polymer in the chamber via an appropriate means, the polymer is ready to be harvested. In the embodiment in which the chamber is formed of two opposing heat exchange plates, at least one of which has a peripheral lip, the plates can then be separated from each other and the final polymer recovered. Recovery can be accomplished manually or mechanically, by pulling or peeling the polymer from the chamber's inner surface. As already noted, use of an appropriate release agent can make this recovery easier or faster.

Since the polymer, which preferably has a hard, rubbery consistency, will be thereafter ground to enable it to be introduced into the liquid hydrocarbon being pumped, it is desirable to prevent its agglomeration. Thus, removal of the polymer into a collection bin containing an anti-agglomeration agent is preferred. Possible anti-agglomeration agents include, for example, talc, alumina, silicones, and salts of fatty acids having from about 12 to about 20 carbon atoms. Among such anti-agglomeration agents are, for example, alkali earth metal salts of such fatty acids, micronized polyethylene waxes, stearamide and bis-stearamide.

Once the polymer is removed, the chamber can be reused or disposed of. The embodiment in which the chamber is formed of opposing "lipped" heat exchange plates is particularly amenable to a design suitable for disposal, since thin plates of a relatively inexpensive material such as aluminum can be used in some cases. Such materials choices may make disposal of the plates economical and avoid some associated labor and maintenance costs. Non-disposable plates can also be effectively used.

The polymer resulting from the practice of the present invention, particularly in the case of production of drag reducing agent polymers, preferably has a conversion of from greater than about 60 percent, more preferably from about 70 percent, most preferably from about 80 percent, to about 100 percent. This polymer is preferably suitable for comminution, preferably by grinding, using any means or method known to those skilled in the art. Following comminution it can be incorporated, either directly or in an aqueous or non-aqueous slurry further including alcohols, glycols, glycol ethers or mixtures thereof, into the hydrocarbon or other fluid stream where drag reduction is desired. Preferably this continuous phase is compatible with the liquid hydrocarbon which is to be treated with the drag reducing agent. Alternatively, polymers that are not destined to be used in drag reducing agents can be appropriately processed to enable use in other desired applications.

The drawings included herein will help to illustrate aspects of certain embodiments of the present invention. With reference to FIG. 1, two heat exchange plates 12 and 15 are shown. The plates 12 and 15 are shown in articulated, or "closed", position. Plate 15 comprises a shell 18 configured with a raised peripheral edge 21 on which is located a lip enhancement 24. Shell 18 has flowably connected therewith a coolant inlet 27 and a coolant outlet 30. The coolant inlet 27 is connected to a coolant source (not shown), distal to plate 15, which supplies coolant to flow along a coolant flow path, shown by arrows 33, within the coolant flow area 35 (shown for plate 12 but not visible in plate 15 ), and out of the same coolant flow area 35 via coolant outlet 30. Welds 34 in the coolant flow area (not shown) of plate 15 establish the coolant flow path 33. The welds are also impliedly present in the coolant flow area 35 of plate 12 but are not shown. Plate 15 also has an effective heat exchange surface 37, a polymerization mixture inlet 43, a purge inlet 46, and a vent 49. A void space 40 is formed when plate 15 is articulated, as shown, with plate 12. Plate 12 is identical to plate 15 in construction, except that it lacks any polymerization mixture inlet, a purge inlet, or vent that would flowably connect with the chamber formed with Plate 15.

In use, plate 15 is sealably articulated with plate 12 at peripheral edges 21a and 21b, as shown, to form a closed chamber 52 surrounded by shell 18. While coolant flows along coolant flow path 33 within the coolant flow area (not shown) of plate 15, and also a corresponding flow path (not shown) in plate 12, polymerization mixture is flowed into the void space 40 formed between the plates 12 and 15 and surrounded also by the peripheral edge 21a of plate 15 and the corresponding peripheral edge 21b of plate 12. Once the polymerization mixture has polymerized at the temperature predetermined according to both the temperature of the effective heat exchange surface 37a of plate 15, and the corresponding and opposing effective heat exchange surface 37b of plate 12, and the constituency of the polymerization mixture itself, the plates 12 and 15 can be disarticulated or separated, i.e., the chamber 52 is opened, to enable removal of solid polymer therefrom.

Figure 2:
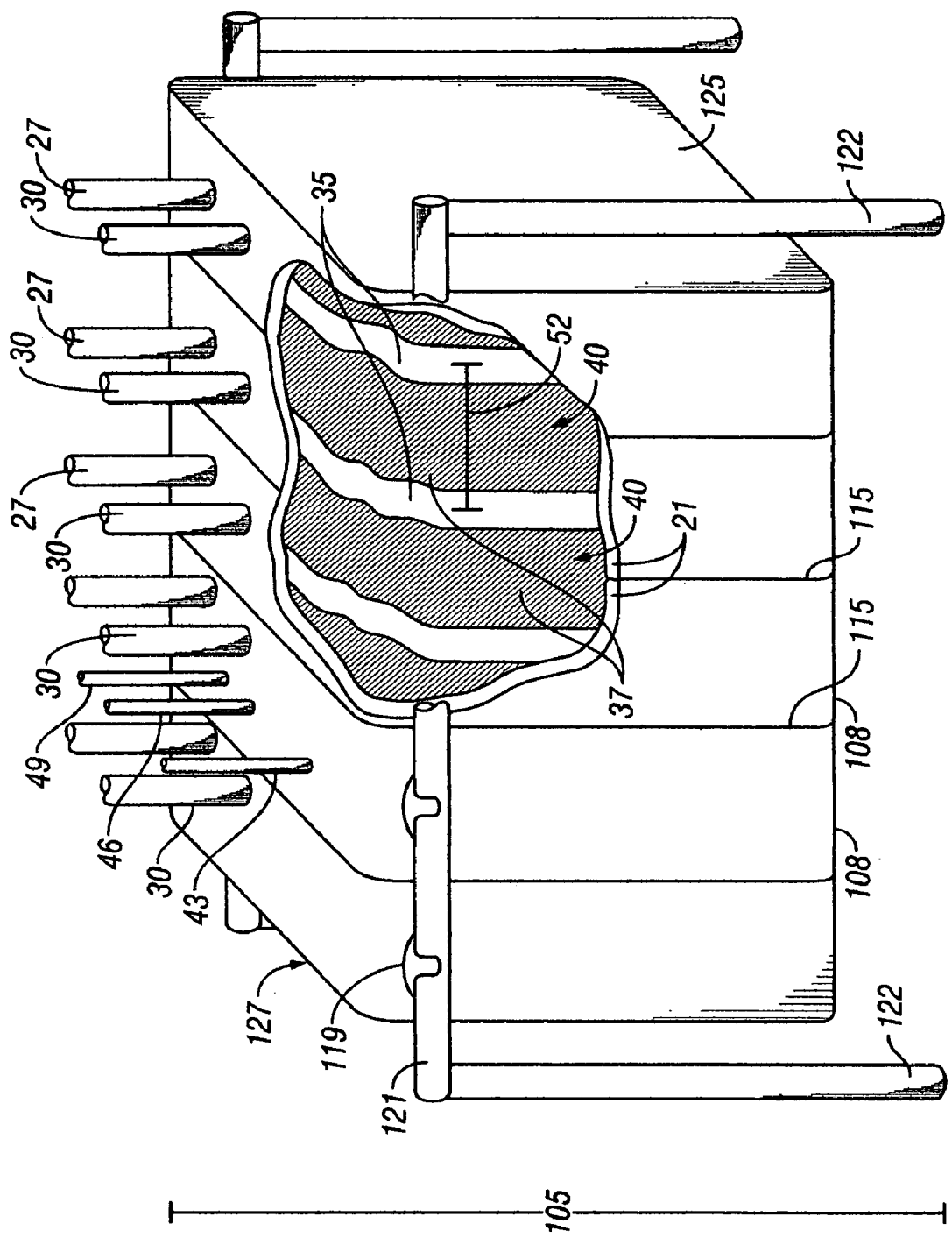
FIG. 2 is a cut-away and perspective view of a multi-chambered apparatus of the present invention.

FIG. 2 shows a multi-chambered assembly 105 of the present invention. In this figure a series of heat exchange plates 108 are arranged in parallel, their (external) peripheral edges 21 abutting at locations 115. The plates 108 hang slidably via a hook 119 on bar 121 such that the plates 108 can be moved apart. It is understood, but not shown, that the abutment of the plates can be secured by conventional means, such as the use of bolts and corresponding nuts, or by simple mechanical compression of the array as a whole at surfaces 125 and 127, using any means known to those skilled in the art. The bar 121 is supported by supports 122. In closed (abutting) position as shown, the plates 108 form a series of chambers 52 which comprise the void spaces 40 between the effective heat exchange surfaces 37. Coolant inlets 27 and coolant outlets 30 are in flowable connection with coolant flow areas 35, which is where the coolant flow paths (not shown) are located. Polymerization inlets 43, purge inlets 46, and vents 49 are located appropriately in flowable connection with the void space 40 of each chamber 52 to enable purging and filling thereof.

The following examples are provided to further illustrate the present invention and are not meant to be, nor should they be construed as being, limitative in any way of its various embodiments.

EXAMPLES

Example 1

A reaction chamber configured as shown in FIG. 1 is prepared by applying a thin film of a silicone emulsion release agent, sold under the tradename RUBBER LUBRICANT by Jet-Lube, Inc., to the effective heat exchange surface thereof while the chamber is open, followed by air drying for about 2 hours and then buffing with a soft cloth to remove any excess residue. The reaction chamber is then closed by contacting the peripheral lips of the heat exchange plates. The chamber is then purged with nitrogen via a purge inlet such as is shown in FIG. 1. At the same time, a 50/50 mixture of ethylene glycol and water, at a temperature of about 30 degrees Fahrenheit (about −1 degree Celsius), is circulated from a coolant source, through a coolant inlet and along a coolant flow path behind the effective heat exchange surface, and back to the coolant source for continuous cooling thereof.

A drag reducing agent ("DRA") polymer is prepared by preparing a first mixture of about 1.37 g of aluminum-activated titanium trichloride (type C); about 1.21 g of diethylaluminum chloride; about 0.44 g of diethylaluminum ethoxide; and about 80 g of kerosene. Mixing is accomplished in a magnetically stirred round-bottom flask and continued at 30 degrees Fahrenheit temperature for about 12 hours.

A second mixture is prepared using about 955 g of 1-hexene and about 2230 g of 1-dodecene.

The mixtures are then combined by continuously adding the first mixture, flowing at a rate of about 1 g per minute, to the second mixture, flowing at a rate of about 53.2 g per minute, to form a polymerization mixture at a temperature of about 30 degrees Fahrenheit (about −1 degree Celsius). The resulting polymerization mixture is mixed using an inline static mixer, then introduced into the reaction chamber via pumping through a polymerization mixture inlet into the void space of a reaction chamber configured as shown in FIG. 1. Pumping is stopped when the polymerization mixture overflows through the vent. indicating that the void space has been filled. A valve located at the polymerization mixture inlet is then closed.

Polymerization is allowed to occur within the reaction chamber for about 20 hours. Monitoring of the temperature of the coolant and of the polymerization mixture indicates that little or no exotherm is continuing to occur within the reaction chamber at that point. The temperature of the polymerization mixture is held in the range of 30±2 degrees Fahrenheit (−1±about 1 degree Celsius). At the end of that time the reaction chamber is opened by manually pulling apart the heat exchange plates that form the chamber wall thereof. The solid polymer slab therein is then manually removed.

The solid polymer slab is an ultra-high molecular weight poly-alpha-olefin, a drag reducing agent polymer. The weight of the polymer is about 2771 g, indicating a monomer conversion rate of about 87 percent. The slab is then converted to granular form.

Comparative Example A

A solution drag reducing agent polymer is prepared using the same components and proportions as described in Example 1, except that the monomers are first charged, with about 29,333 lb of isopentane, into a 6000 gallon jacketed reactor vessel. The reactor contents are mixed using an agitator and are cooled to an overall temperature of about 5 degrees Fahrenheit (about −15 degrees Celsius) by circulating coolant through the jacket. The catalyst mixture is then added and mixing is continued for about 180 minutes. Mixing is then stopped to allow completion of polymerization.

As the polymerization progresses, the exothermic reaction causes the solution temperature to rise. The polymerization is allowed to continue for about 18 hours, during which the polymerization mixture temperature rises from about 5 degrees to about 65 degrees Fahrenheit (about −15 degrees to about 18 degrees Celsius). A monomer conversion of about 80 percent is achieved.

The polymer solution is then removed from the reactor via a pump and transferred into storage. This polymer solution is a drag reducing agent composition which is a highly viscous gel.

Comparative Example B

The drag reducing agent compositions of Example 1 and Comparative Example A are first dispersed in a 70/30 1-hexanol/dipropylene glycol monomethyl ether diluent, then dissolved in hexane and finally further diluted, using hexane, to the concentrations shown in Table 1, to form the indicated drag reducing agents ("DRA Compositions"). These dissolved and diluted DRA Compositions are then similarly flowed through a test pipeline and the pressure drop for each across a 4-foot test section noted. The ratio of the pressure drop of the drag reducing agent in comparison to that experienced by neat hexane, multiplied by 100, gives the % Drag Reduction. The % Drag Reduction is taken as a measure of the polymer quality, with higher numbers indicating higher polymer quality. The results shown in Table 1 are obtained for DRA Compositions based upon the polymers made in Example 1 and Comparative Example A.

TABLE 1

| DRA Composition | Polymer Concentration, PPM | % Drag Reduction |
|---|---|---|
| Example 1 | 0.25 | 61 |
| Comparative Example A | 0.50 | 60 |

From the above results it is seen that the DRA Composition based on the polymer prepared in Example 1 is superior in performance when compared with the DRA Composition based on the polymer prepared in Comparative Example A, because it requires only half as much of the Example 1 polymer to attain comparable drag reduction. This represents a very significant economic advantage in a commercial setting.

In the foregoing specification, the invention has been described with reference to specific embodiments thereof, and has been demonstrated as particularly effective in preparing drag reducing agent polymers for use in hydrocarbon transportation pipelines. However, it will be evident that various modifications and changes can be made to the steps and components used in the method without departing from the broader spirit or scope of the invention as set forth in the appended claims. Accordingly, the specification is to be regarded in an illustrative rather than a restrictive sense. For example, it can be adapted to preparation of any polymers for which relatively narrow temperature control, and overall exotherm reduction, is necessary or desired. Thus, specific combinations of starting materials to form the polymerization mixture, specific polymerization temperatures and ranges thereof, and specific configurations of the chamber, falling within the claimed parameters but not specifically identified or tried, are anticipated and expected to be within the scope of this invention.

The invention claimed is:

1. An apparatus for preparing a polymer under predetermined temperature conditions comprising a plurality of closed reaction chambers, each chamber configured as a void space surrounded by an inner chamber surface of which at least about 75 percent is an effective heat exchange surface, the void space's dimensions being such that, if a polymerization mixture were polymerized within the reaction chamber, the polymerization mixture would contact the effective heat exchange surface sufficiently to ensure that the temperature of the polymerization mixture can be controlled within about 5 degrees Fahrenheit of a desired temperature during the polymerization, the reaction chambers being capable of being reversibly opened to an extent sufficient to enable removal of solid polymer that has formed therein as a result of the polymerization wherein each reaction chamber is formed of a pair of opposing, substantially planar heat exchange plates, at least one of which has a peripheral lip, the plates arranged in parallel such that the peripheral lip reversibly contacts a surface of the opposing plate to form the closed reaction chamber, the peripheral lip determining the shortest distance across the void space between the opposing plates.

2. The apparatus of claim 1 wherein the peripheral lip includes a peripheral lip enhancement.

3. The apparatus of claim 1 wherein the shortest distance across the void space between the opposing plates is less than or equal to about 3 inches.

4. The apparatus of claim 1 wherein the heat exchange plate's effective surface is constructed of polished or unpolished stainless steel, glass, copper, brass, aluminum, or a combination thereof.

5. The apparatus of claim 1 wherein the effective heat exchange surface is contacted on its back by a coolant circulated from a coolant source.

6. The apparatus of claim 1 wherein the plurality of chambers is formed by a plurality of parallel heat exchange plates.

7. An apparatus for preparing a polymer under predetermined temperature conditions comprising a plurality of closed reaction chambers formed by a plurality of parallel heat exchange plates, each chamber configured as a void space surrounded by an inner chamber surface of which at least about 75 percent is an effective heat exchange surface, where the effective heat exchange surface is on its back in flowable contact with a coolant surface, the void space's dimensions being such that, if a polymerization mixture were polymerized within the reaction chamber, the polymerization mixture would contact the effective heat exchange surface sufficiently to ensure that the temperature of the polymerization mixture can be controlled within about 5 degrees Fahrenheit of a desired temperature during the polymerization, the reaction chambers being capable of being reversibly opened to an extent sufficient to enable removal of solid polymer that has formed therein as a result of the polymerization, wherein each reaction chamber is formed of a pair of opposing, substantially planar heat exchange plates, at least one of which has a peripheral lip, the plates arranged in parallel such that the peripheral lip reversibly contacts a surface of the opposing plate to form the closed reaction chamber, the peripheral lip determining the shortest distance across the void space between the opposing plates.

8. The apparatus of claim 7 wherein the peripheral lip includes a peripheral lip enhancement.

9. The apparatus of claim 7 wherein the shortest distance across the void space between the opposing plates is less than or equal to about 3 inches.

10. The apparatus of claim 7 wherein the heat exchange plates effective surface is constructed of polished or unpolished stainless steel, glass, copper, brass, aluminum, or a combination thereof.

11. An apparatus for preparing a polymer under predetermined temperature conditions comprising a plurality of closed reaction chambers formed by a plurality of parallel heat exchange plates, each chamber configured as a void space surrounded by an inner chamber surface of which at least about 75 percent is an effective heat exchange surface, where the effective heat exchange surface is on its back in flowable contact with a coolant surface, the void space's dimensions being such that, if a polymerization mixture were polymerized within the reaction chamber, the polymerization mixture would contact the effective heat exchange surface sufficiently to ensure that the temperature of the polymerization mixture can be controlled within about 5 degrees Fahrenheit of a desired temperature during the polymerization, the reaction chambers being capable of being reversibly opened to an extent sufficient to enable removal of solid polymer that has formed therein as a result of the polymerization, wherein the shortest distance across the void space between the opposing plates is less than or equal to about 3 inches, and wherein the heat exchange plate's effective surface is constructed of polished or unpol ished stainless steel, glass, copper, brass, aluminum, or a combination thereof, wherein each reaction chamber is formed of a pair of opposing, substantially planar heat exchange plates, at least one of which has a peripheral lip, the plates arranged in parallel such that the peripheral lip reversibly contacts a surface of the opposing plate to form the closed reaction chamber, the peripheral lip determining the shortest distance across the void space between the opposing plates.

12. The apparatus of claim 11 wherein the peripheral lip includes a peripheral lip enhancement.

* * * * *